United States Patent
David et al.

(10) Patent No.: US 9,886,457 B2
(45) Date of Patent: Feb. 6, 2018

(54) DEDUPLICATED DATA PROCESSING HIERARCHICAL RATE CONTROL IN A DATA DEDUPLICATION SYSTEM

(71) Applicant: INTERNATIONAL BUSINESS MACHINES CORPORATION, Armonk, NY (US)

(72) Inventors: Johnny David, Tel Aviv (IL); Afief Halumi, Tel Aviv (IL); Lior Tamary, Omer (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

(21) Appl. No.: 14/203,130

(22) Filed: Mar. 10, 2014

(65) Prior Publication Data
US 2015/0254297 A1    Sep. 10, 2015

(51) Int. Cl.
G06F 17/30 (2006.01)
G06F 11/14 (2006.01)

(52) U.S. Cl.
CPC .. *G06F 17/30303* (2013.01); *G06F 17/30156* (2013.01); *G06F 11/1453* (2013.01)

(58) Field of Classification Search
CPC ......... G06F 17/30156; G06F 17/30159; G06F 17/30303; G06F 17/30371; G06F 17/30489; G06F 11/1464; G06F 11/1402
USPC .............. 707/609, 821, 692, 693, 792, 793; 718/104, 100; 705/7.12, 26.82; 715/733; 706/16; 702/184; 712/202
See application file for complete search history.

(56) References Cited

U.S. PATENT DOCUMENTS

| | | | | |
|---|---|---|---|---|
| 6,961,720 B1* | 11/2005 | Nelken | ................ | G06F 9/4881 706/16 |
| 7,836,448 B1* | 11/2010 | Farizon | ................ | G06F 9/4843 709/225 |
| 7,912,820 B2* | 3/2011 | Garden | ............ | G06F 17/30306 707/702 |
| 8,095,756 B1* | 1/2012 | Somavarapu | ....... | G06F 11/1453 711/162 |
| 8,327,369 B2* | 12/2012 | Bower, III | ............ | G06F 9/4843 718/100 |
| 8,499,300 B2* | 7/2013 | Zimberg | ................ | G06Q 10/06 705/7.12 |

(Continued)

FOREIGN PATENT DOCUMENTS

EP    2557514 A1    2/2013

OTHER PUBLICATIONS

Anonymous, "Multiple Identifiers to Reconcile and Deduplicate Metadata in a Repository", Sep. 30, 2013, http://ip.com/IPCOM/000231455D, An IP.com Prior Art Database Technical Disclosure.

(Continued)

*Primary Examiner* — Frantz Coby
(74) *Attorney, Agent, or Firm* — Griffiths & Seaton PLLC

(57) ABSTRACT

For deduplicated data processing hierarchical rate control in a data deduplication system in a computing storage environment, priorities in a hierarchal structure are propagated by defining a relationship between each of a plurality of maintenance tasks and using a resource distribution function for managing and dividing resources between the plurality of maintenance tasks based on a priority for each maintenance task.

17 Claims, 6 Drawing Sheets

(56) References Cited

U.S. PATENT DOCUMENTS

| | | | |
|---|---|---|---|
| 8,522,240 B1* | 8/2013 | Merwarth | G06Q 10/0631 |
| | | | 705/26.82 |
| 8,813,089 B2* | 8/2014 | Baruch | G06F 9/5005 |
| | | | 718/104 |
| 8,856,799 B2* | 10/2014 | Baruch | G06F 9/5005 |
| | | | 718/104 |
| 9,117,093 B2* | 8/2015 | Gross | G06F 11/0712 |
| 2005/0187739 A1* | 8/2005 | Baust | G06Q 10/20 |
| | | | 702/184 |
| 2006/0155671 A1* | 7/2006 | Bantz | G06F 21/56 |
| 2006/0190938 A1* | 8/2006 | Capek | G06F 9/46 |
| | | | 717/161 |
| 2007/0192569 A1* | 8/2007 | Garnier | G06F 12/0875 |
| | | | 712/202 |
| 2007/0226461 A1* | 9/2007 | Garnier | G06F 7/785 |
| | | | 712/202 |
| 2009/0133027 A1* | 5/2009 | Gunning | G06Q 10/06 |
| | | | 718/103 |
| 2010/0064166 A1* | 3/2010 | Dubnicki | G06F 17/30067 |
| | | | 714/4.1 |
| 2012/0131025 A1* | 5/2012 | Cheung | G06F 17/30159 |
| | | | 707/755 |
| 2012/0159098 A1* | 6/2012 | Cheung | G06F 12/0261 |
| | | | 711/162 |
| 2012/0159336 A1* | 6/2012 | Norwood | G06F 3/0482 |
| | | | 715/733 |
| 2012/0233417 A1* | 9/2012 | Kalach | G06F 11/1469 |
| | | | 711/162 |
| 2013/0054894 A1 | 2/2013 | Kawaguchi | |
| 2013/0111490 A1* | 5/2013 | Baruch | G06F 9/5005 |
| | | | 718/104 |
| 2013/0132958 A1* | 5/2013 | Jain | G06F 9/52 |
| | | | 718/100 |
| 2015/0159098 A1* | 6/2015 | Chen | C10J 3/86 |
| | | | 252/373 |

OTHER PUBLICATIONS

Coyne et al., "IBM System Storage N Series Data Compression and Deduplication Data ONTAP 8.1 Operating in 7-Mode" Jul. 2012, http://www.ibm.com/redbooks/sg24-8033-00.

Osuna et al., "Implementing IBM Storage Data Deduplication Solutions" Mar. 2011, http://www.ibm.com/redbooks/sg24-7888-00.

* cited by examiner

```
1   TASK_X_RATE_LIMIT_SELECTOR::INIT()
2   {   max_limit ← A }

3   TASK_X_RATE_LIMIT_SELECTOR::GET_RATE_LIMIT()
4   {
5     current_limit_percent ← CALC_TASK_PERCENT (X)
6     return (max_limit x current_limit_percent)
7   }
```
310

```
1   CALC_TASK_PERCENT(task)
2   {
3     result ← 0
4     mutex.LOCK()
5     {
6       resources_percents_array ← CALC_TASKS_PERCENTS()
7       result ← resources_percents_array[task]
8     }
9     mutex.UNLOCK()
10
11    return result
12  }
```
320

```
1   CALC_TASKS_PERCENTS()
2   {
3     // check mission critical workload
4     work_load ← CHECK_SYSTEM_MISSION_CRITICAL_LOAD()
5
6     // calculate tasks urgencies
7     foreach task {
8       urgencies_array[task] ← CALC_TASK_URGENCY()
9     }
10    maintenance_urgency ← MAX(urgencies_array)
11
12    overall_percent ← CALC_OVERALL_PERCENT(maintenance_urgency,
                                              work_load)
13
14    relative_percents_array ←CALC_RELATIVE_PERCENTS(urgencies_array)
15
16    // determine each task's percent
17    foreach task {
18      result_array[task] ← (relative_percents_array[task] x
19                            overall_percent)
20    }
21
22    return resources_percents_array
23  }
```
330

FIG. 3

PRIORITY ARRAY: $P_{Defrag}, P_{Scrub}, Max_{Continuous}, P_{Delete}, Max_{Maintenance}$
HIERARCHY

THE DEFAULT PRIORITIES

PRIORITIES IN CASE OF "LOW DELETE BACKLOG"

US 9,886,457 B2

DEDUPLICATED DATA PROCESSING HIERARCHICAL RATE CONTROL IN A DATA DEDUPLICATION SYSTEM

BACKGROUND OF THE INVENTION

Field of the Invention

The present invention relates in general computing systems, and more particularly to, systems, computer program products, and methods for deduplicated data processing hierarchical rate control in a data deduplication system.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. For the most part, computing systems face a significant challenge to meet the increasingly stringent reliability demands and while providing complex and sophisticated data storage systems. Providing accesses to computing resources is a key problem to solve, and therefore, a need exists to improve the usage and management of computing resources within the computer resources.

SUMMARY OF THE INVENTION

In one embodiment, a method is provided for deduplicated data processing hierarchical rate control in a data deduplication system by at least one processor device in a computing storage environment. In one embodiment, by way of example only, the method propagates priorities in a hierarchal structure by defining a relationship between each of a plurality of maintenance tasks and using a resource distribution function for managing and dividing resources between the plurality of maintenance tasks based on a priority for each maintenance task.

In another embodiment, a computer system is provided for deduplicated data processing hierarchical rate control in a data deduplication system using at least one processor device, in a computing environment. The computer system includes a computer-readable medium and a processor in operable communication with the computer-readable medium. In one embodiment, by way of example only, the processor propagates priorities in a hierarchal structure by defining a relationship between each of a plurality of maintenance tasks and using a resource distribution function for managing and dividing resources between the plurality of maintenance tasks based on a priority for each maintenance task.

In a further embodiment, a computer program product is provided for deduplicated data processing hierarchical rate control in a data deduplication system using at least one processor device, in a computing environment. The computer-readable storage medium has computer-readable program code portions stored thereon. The computer-readable program code portions include a first executable portion that propagates priorities in a hierarchal structure by defining a relationship between each of a plurality of maintenance tasks and using a resource distribution function for managing and dividing resources between the plurality of maintenance tasks based on a priority for each maintenance task.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is a diagram illustrating an algorithm of one embodiment of pseudo code for implementing the method of FIG. 2 in computer-executable code in which aspects of the present invention may be realized.

DETAILED DESCRIPTION OF THE DRAWINGS

Figure 1:
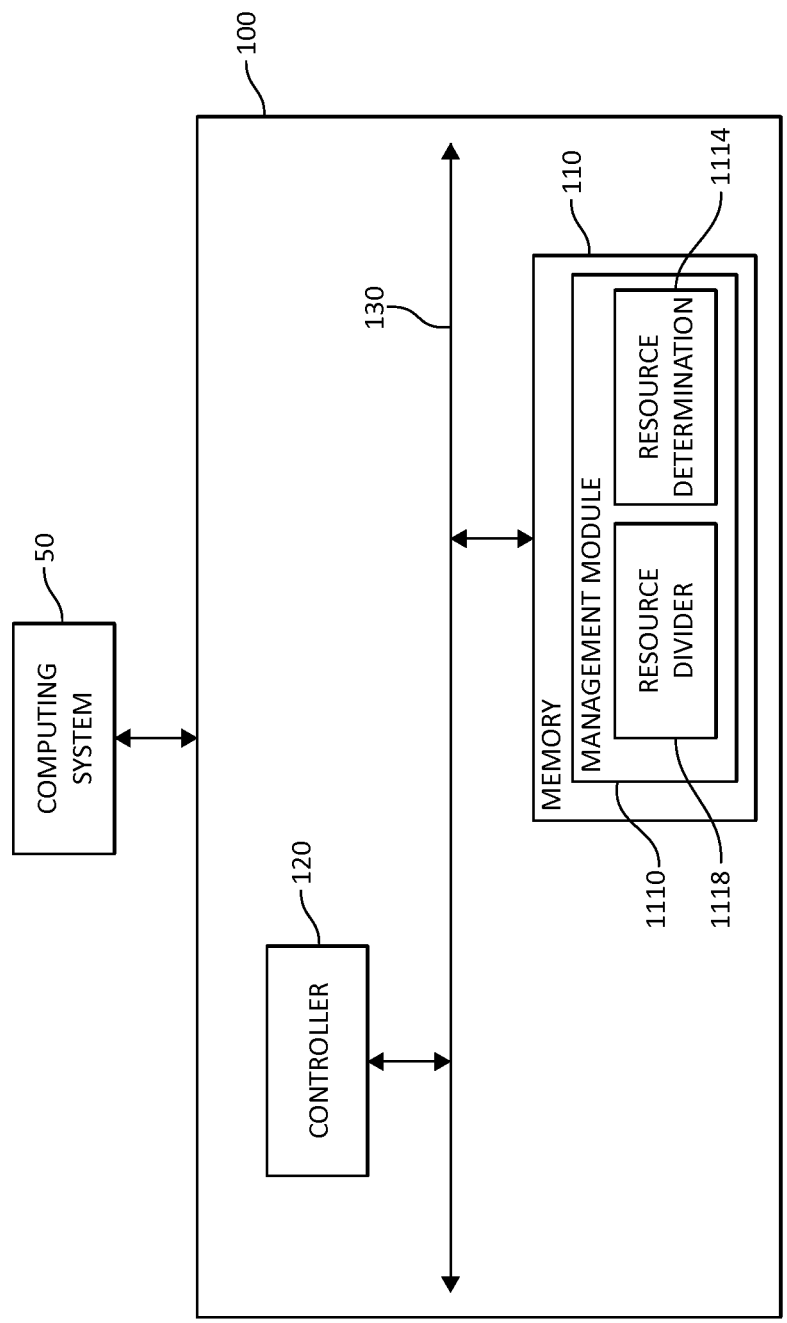
FIG. 1 is a block diagram of one embodiment of a system for managing resources for maintenance tasks in which aspects of the present invention may be realized.

Data deduplication is an emerging field in storage systems in recent years. The core idea a data deduplication is storing single instances of duplicated data. A challenge to deduplication is to efficiently locate duplicated data patterns in typically large repositories, and to store those data patterns in an efficient deduplicated storage form. Deduplicated data entities might become obsolete or fragmented over time. This means that the deduplicated storage systems might need to perform maintenance tasks (e.g., delete tasks or "defragment" tasks, etc.) on the deduplicated data entries or rearrange the physical storage space on which the deduplicated data entries reside.

It should be noted that the various maintenance tasks responsible for maintaining the deduplicated data entries are performed by a plurality of controllers. Specifically, a different controller manages each maintenance task and each controller is responsible for controlling the rate at which its maintenance task is performed. For example, a delete task that deletes deduplicated data entries at a nominal rate are managed by a first controller, while a defragment task that defragments deduplicated data entries at a physical rate is managed by a second controller. Since current computing systems utilize multiple controllers, these computing systems do not utilize system resources as efficiently as they otherwise could use system resources.

Thus, to address the challenges of utilizing system resources more efficiently, the present invention provides a solution for efficient resources management of maintenance tasks in a data deduplication system. As described below, the data deduplication system may provide efficient resources management for only 2 different maintenance tasks, but extends efficient resources management so to be able to handle a management of "k" maintenance tasks, where is some value greater than 1.

As the computer systems evolve, more types of maintenance tasks may be required. Moreover, the more maintenance tasks there are in the computing system, the more complex it becomes to define the relations between them, and allocate resources accordingly. For example, consider a scenario with only 2 tasks only, such as task A and task B, and equal allocation at the beginning with each task receiving 50% of the resources. Then, when a rate controller concludes that 10% of the resources should be added to task A, task B will now receive exactly 10% less, and perform a calculation so that task A will get 60% and task B will receive 40% of the computing system resources.

However, with 5 tasks (e.g., tasks A, B, C, D, and E) and also an equal initial allocation of the computing system resources, each task will be allocated 20% of the computing system resources. When the controller wishes to allocate an additional amount, such as 10% extra for task A, there are many possibilities for adjusting the computing system resources such as: reducing 10% of the computing system resources from task B, taking 10% of the computing system resources from task C, or taking 5% from both task B and C, or even 2.5% from each of the other tasks in the system. In other words, the readjustments of the computing system resources from task to tasks for maximizing resources may be challenging. It should be noted, as described herein, the processes also compete for resources with non-maintenance tasks, which are managed by the system. They do it in an unknown manner, which is beside the scope of this document. A maintenance task is a background process that needs certain amount of resources in order to operate, depending on the priority of the task. The resources are general and the only properties relied on are quantifiable and divisible. For example, maintenance tasks may be defragmentation operations, delete operations, and/or garbage collection. Resources examples may include input/output (I/O), central processing unit (CPU) usage, and the like. The priority gives the system a hint as for which task is more important to the general result. And a number, or calculated variable, is used to denote the priority.

To define the relation between the different tasks, a hierarchal structure is used. A hierarchy is an arrangement of items in which the items are represented as being above, below, and/or at the same level as one another. As described herein, the hierarchal structure may be a tree-structure. Only the leaf-nodes of the tree-structure are actual tasks, and the branch-nodes are virtual tasks, whose purpose is to group tasks. Such hierarchy provides flexibility of managing the resource allocation for every virtual component independently of other components while still using simple intuitive distribution functions. For example if there is a delete task for which it is desired to save a certain amount of resources, the present invention defines the following hierarchy: the resources will be divided in a certain manner between the delete task and a virtual task continuous, and the remainder of the tasks will be below the continuous task so that the rest of the resources (e.g., those resources that are not assigned/given to the delete task) will be divided between the remainder of the tasks below the continuous task.

In one embodiment, the present invention deals with managing a hierarchy of maintenance tasks in a deduplicated storage system, such as defragmentation tasks, delete tasks, and the like, and focuses on a technique for handling maintenance tasks on a repository (e.g., a repository of deduplicated metadata). Furthermore, the present invention handles an "N" number of tasks in as hierarchical task structure, as opposed to only 2 tasks.

Various embodiments provide systems for managing resources for maintenance tasks. One system comprises a controller and memory coupled to the controller, the memory configured to store a module. The controller, when executing the module, is configured to determine an amount of available resources for use by a plurality of maintenance tasks in a computing system and divide the available resources between the plurality of maintenance tasks based on a need for each maintenance task.

Thus, as described herein, the present invention provides for a deduplicated data processing hierarchical rate control in a data deduplication system by at least one processor device in a computing storage environment. In one embodiment, by way of example only, the priorities are propagated in a hierarchal structure by defining a relationship between each of a plurality of maintenance tasks and using a resource distribution function for managing and dividing resources between the plurality of maintenance tasks based on a priority for each maintenance task.

The embodiments illustrated below provide systems and methods for managing resources for maintenance tasks. Also provided are physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for managing resources for maintenance tasks in computing systems.

Turning now to the figures, FIG. 1 is a block diagram of one embodiment of a system 100 for managing resources for maintenance tasks in a computing system 50 (e.g., a deduplicated storage system) coupled to system 100. At least in the illustrated embodiment, system 100 comprises memory 110 coupled to a controller 120 via a bus 130 (e.g., a wired and/or wireless bus).

Memory 110 comprises one or more physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, and/or a magnetic storage device). In one embodiment, memory 110 comprises a management module 1110 for managing resources for maintenance tasks in computing system 50.

Management module 1110, in various embodiments, comprises computer-executable code for managing resources for maintenance tasks in computing system 50. Management module 1110 may be written in any combination of one or more programming languages, including an object-oriented programming language such as Java, Smalltalk, C++, and/or the like, and conventional procedural programming languages, such as the "C" programming language or similar programming languages.

In one embodiment, management module 1110 comprises a resource determination mechanism 1114 for determining the amount of resources that are available for maintaining computing system 50 and a resource divider mechanism 1118 for dividing the determined available resources amongst a plurality of maintenance tasks for computing system 50. In the various embodiments of management module 1110, resource determination mechanism 1114 and resource divider mechanism 1118 are each written in computer-readable code capable of being executed by controller 120.

Controller 120, in one embodiment, is configured to execute the code that comprises management module 1110 and, particularly, resource determination mechanism 1114 and resource divider mechanism 1118. When executing resource determination mechanism 1114, controller 120 is configured to determine the amount of resources in computing system 50 that are available for use by one or more tasks (e.g., maintenance tasks) responsible for maintaining and/or servicing input/output (I/O) operations in computing system 50. In one embodiment, controller 120 is configured to measure the nominal throughput of computing system 50 to determine to amount of available resources. Specifically, controller 120 is configured to subtract the nominal throughput from the maximum throughput of computing system 50 to determine the amount of resources available in computing system 50.

In another embodiment, controller 120 is configured to count the number of input/output (I/O) operations per second that computing system 50 performs to determine to amount of available resources. Specifically, controller 120 is configured to subtract the number of I/O operations per second that computing system 50 is currently performing from the maximum the number of I/O operations per second that computing system 50 is capable of performing to determine the amount of resources available in computing system 50.

In other embodiments, controller 120 is capable of determining the amount of available resources by using a combination of measuring the nominal throughout and the current number of I/O operations that computing system 50 is currently performing. That is, controller 120 capable of combining the measured nominal throughput and the measured number of I/O operations per second in computing system 50 to determine the amount of available resources in computing system 50.

In one embodiment, controller 120 is further configured to execute resource divider mechanism 1118 to determine which maintenance tasks need to be performed in computing system 50 and to determine which resources of the determined available resources should be allocated to which maintenance tasks. Specifically, controller 120 is configured to determine which data processing task(s) or algorithm(s) to perform based on the maintenance needs of computing system 50. For example, when there are no mission critical tasks, ninety percent (90%) of the available resources in computing system 50 may be allocated for deletion and/or defragmentation tasks. After the needed maintenance tasks are determined, controller 120 is configured to determine how to allocate the available resources amongst the, for example, maintenance tasks.

In determining how to allocate the available resources, controller 120 is configured to execute resource divider mechanism 1118 to calculate the urgency and/or need for each particular maintenance task. For example, when computing system 50 is experiencing a large backlog of data waiting to be deleted, the urgency of the deletion task is elevated. In response thereto, controller 120 is configured to allocate a larger portion of the available resources to the deletion task. For example, if the backlog of data waiting to be deleted is very large and the other maintenance tasks in computing system 50 are not experiencing a backlog, controller 120 may allocate eighty percent (80%) of the available resources or seventy-two percent (72%) of the overall resources (i.e., 90%×80%=72%) of computing system 50 to the delete task, while further dividing the remaining twenty percent (20%) of the available resources of computing system 50 to the remaining maintenance task(s) that need servicing.

Since every type of maintenance task has its own set of rate limits to control its data processing rate, controller 120 is configured to divide the available resources amongst the maintenance tasks based on the type of rate limit for each respective maintenance task. Specifically, controller 120 is configured to translate the amount of available resources determined via resource determination mechanism 1114 to the limit set for a particular maintenance task because, for example, a defragmentation task uses physical throughput to measure its rate, while the deletion task uses nominal throughput. Because different maintenance tasks use different rate limits, the same percentage of resources may be translated to different sets of rate limits for different maintenance tasks. For example, a defragmentation task may translate 10% of system resources to 25 physical MB/sec, while a deletion task may translate the same 10% of the system resources to 400 nominal MB/sec limitations.

Controller 120 is further configured to monitor computing system 50 to determine the amount of resources available for maintaining computing system 50 and adjust the amount of resources allocated to each maintenance task on a continuous, substantially continuous, or periodic basis. Specifically, as other tasks in computing system 50 need or release system resources, the amount of resources available for maintenance tasks may decrease or increase, respectively. Here, by continuously, substantially continuously, or periodically determining the amount of available resources in computing system 50, controller 120 is capable of making adjustments to the amount of resources allocated to the various maintenance tasks.

Furthermore, controller 120 is configured to monitor the various maintenance tasks that need servicing and adjust the amount of allocated system resources to each maintenance task on a continuous, substantially continuous, or periodic basis. Specifically, as maintenance tasks are performed, the urgency of a maintenance task may increase or decrease based on the operation of computing system 50. As such, controller 120 is configured to continuously, substantially continuously, or periodically determine the urgency of each maintenance task and make adjustments to the amount of resources allocated to the various maintenance tasks based on the latest determination.

For example, after a deletion task has been performing for a period of time, the backlog of I/O operations may have decreased such that the urgency of the deletion tasks has decreased and, as a result, the urgency of defragmentation tasks may have increased. Here, during the continuous, substantially continuous, or periodic monitoring of computing system 50, controller 120 will decrease the amount of available resources allocated to the deletion task and increase the amount of available resources to the defragmentation task. Furthermore, the amount of increase/decrease is also dependent on the amount of available resources in computing system 50, which is also monitored and/or adjusted on continuous, substantially continuous, or periodic basis.

Figure 2:
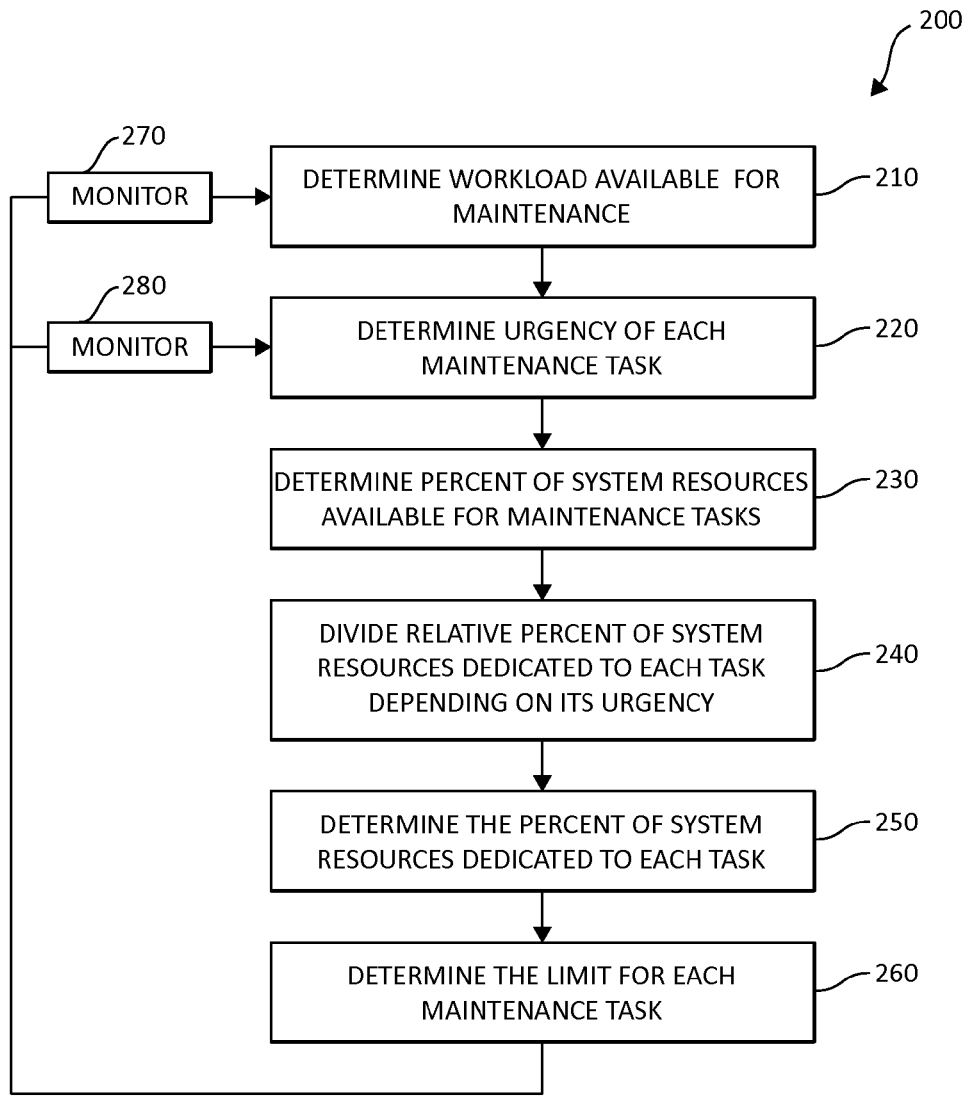
FIG. 2 is a flowchart illustrating an exemplary method for managing resources for maintenance tasks in computing systems which aspects of the present invention may be realized.

Turning now to FIG. 2, FIG. 2 is a flow diagram of one embodiment of a method 200 for managing resources for maintenance tasks in a computing system (e.g., computing system 50). At least in the illustrated embodiment, method 200 begins by determining, by a controller (e.g., controller 120), the workload in the computing system available for or needing maintenance (block 210).

Method 200 further comprises determining the urgency of each maintenance task (block 220). The urgency of each maintenance task, in one embodiment, is based on the amount of maintenance each particular task needs at a particular point in time. For example, a maintenance task that includes a larger backlog of operations will be deemed more urgent than a maintenance task with a smaller backlog. In another example, each maintenance task may be provided with a predetermined hierarchy of importance and the urgency is determined by combining the amount backlog and the hierarchy of importance for each respective task.

In one embodiment, method 200 further comprises determining the amount of those resources available for allocation to maintenance tasks (block 230). After the amount of resources available for the maintenance tasks is determined, method 200 includes dividing the available resources amongst the maintenance tasks based on the determined urgency of each respective maintenance task (block 240).

The amount of system resources allocated to each task is determined by multiplying the amount of system resources available for maintenance tasks and by the divided available resources (block 250). For example, if sixty percent (60%) of the overall system resources are allocated for maintenance tasks and a particular maintenance tasks is determined to need fifty percent (50%) of the available resources, the particular maintenance task will be allocated thirty percent (30%) of the overall system resources (i.e., 60%×50%). The remaining allocated system resources will be divided amongst the remaining maintenance task(s). Specifically, the other 30% of the overall system resources will be divided amongst the other maintenance task(s) based on their respective urgencies.

Method 200 further comprises determining the limit for each maintenance task (block 260). In other words, the amount of available resources for each maintenance task is translated from a percentage to the limit set for a particular maintenance task. For example, a defragmentation task may translate 30% of system resources to 75 physical MB/sec, while a deletion task may translate the same 30% of the system resources to 1200 nominal MB/sec limitations.

In one embodiment, method 200 comprises monitoring the computing system to determine the workload available for maintenance consistent with block 210 (block 270). In another embodiment, method 200 comprises monitoring the computing system to determine the urgency of each maintenance task consistent with block 220 (block 280).

With reference now to FIG. 3, FIG. 3 is a diagram illustrating an algorithm 300 of one embodiment of pseudo code for implementing the method of FIG. 2 in computer-executable code. At least in the illustrated embodiment, algorithm 300 comprises a TASK_X_RATE_LIMIT_SELECTOR module 310. TASK_X_RATE_LIMIT_SELECTOR module 310 is responsible for holding the maintenance task's limit and converting the resources given to the maintenance task to the relevant parameters. In one embodiment, in the initialization phase a controller is given the maximal limit, representing 100 percent of the system resources. In line 5 of TASK_X_RATE_LIMIT_SELECTOR module 310, the controller determines the resources percent and translates the percentage to the maintenance task's limit by, for example, multiplying the percentage by a measurement vector.

CALC_TASK_PERCENT (task) module 320 calculates each maintenance task's percentage by calling to CALC_TASKS_PERCENTS 330 and returning the specified maintenance task's result. Notably the whole algorithm is a critical section encapsulated in mutual exclusion (see lines 4, 9 of CALC_TASKS_PERCENTS 330).

CALC_TASKS_PERCENTS ( ) module 330 calculates the amount available resources, which results may be cached to increase performance. Here, the mission critical workload is determined. Next, in lines 7 through 10 of CALC_TASKS_PERCENTS ( ) module 330, the urgency of each maintenance task is determined. In line 12 of CALC_TASKS_PERCENTS ( ) module 330, the overall percentage of system resources dedicated to the maintenance tasks is determined. This function takes into consideration the system workload and the urgency of each respective maintenance task. This function may use predefined values for each urgency-workload combination or compute the result using the system workload and urgency.

Line 14 of CALC_TASKS_PERCENTS ( ) module 330 calls a method that calculates the relative percentages between the maintenance tasks according to their respective urgencies. For example, in a situation that includes two maintenance tasks, a 50%-50% division is returned when the maintenance tasks have the same urgency or a 90%-10% division is returned when one maintenance task is more urgent than the other maintenance task. In lines 17 to 20 of CALC_TASKS_PERCENTS ( ) module 330, each maintenance task's overall percentage is determined by multiplying the maintenance task's relative percentage and the overall system resources as calculated in line 13 of CALC_TASKS_PERCENTS ( ) module 330.

Figure 4:
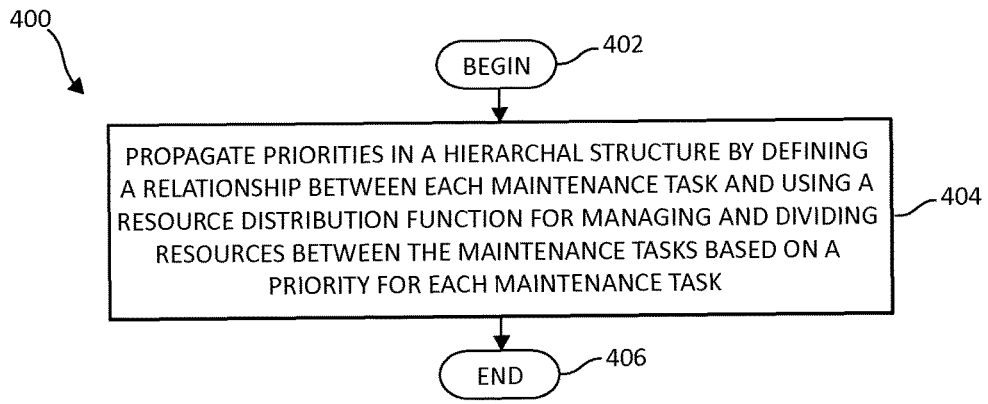
FIG. 4 is a flowchart illustrating an exemplary method for deduplicated data processing hierarchical rate control in a data deduplication system in which aspects of the present invention may be realized.

FIG. 4 is a flowchart illustrating an exemplary method 400 for deduplicated data processing hierarchical rate control in a data deduplication system in which aspects of the present invention may be realized. The method 400 begins (step 402) by propagating priorities in a hierarchal structure by defining a relationship between each maintenance task and using a resource distribution function for managing and dividing resources between the maintenance tasks based on a priority for each maintenance task (step 404). The method 400 ends (step 406).

In one embodiment, by way of example only, the priorities propagate from the leaves to the root of the hierarchy structure by simply choosing the maximum priority. The resource distribution function takes as parameters the total resources assigned to the parent task T, the priorities of the tasks $p_i$, as well as the default distribution $d_i$. In order not to traverse the hierarchy structure (e.g., the tree-structure) every time a priority changes, on initialization, the computing system will allocate an array that contains a reverse polish notation (RPN) for calculating the priority of the root at the tree, and at each level, storing the result of calculation in the virtual task nodes.

In order to coordinate the resource consumption of the maintenance tasks with the main system the resources allocated to the root task should be adjusted by the system to the reflect the capabilities of the system all while allowing a minimum amount of resources to be used for the maintenance task. A controller controls each task's rate of work.

Figure 5:
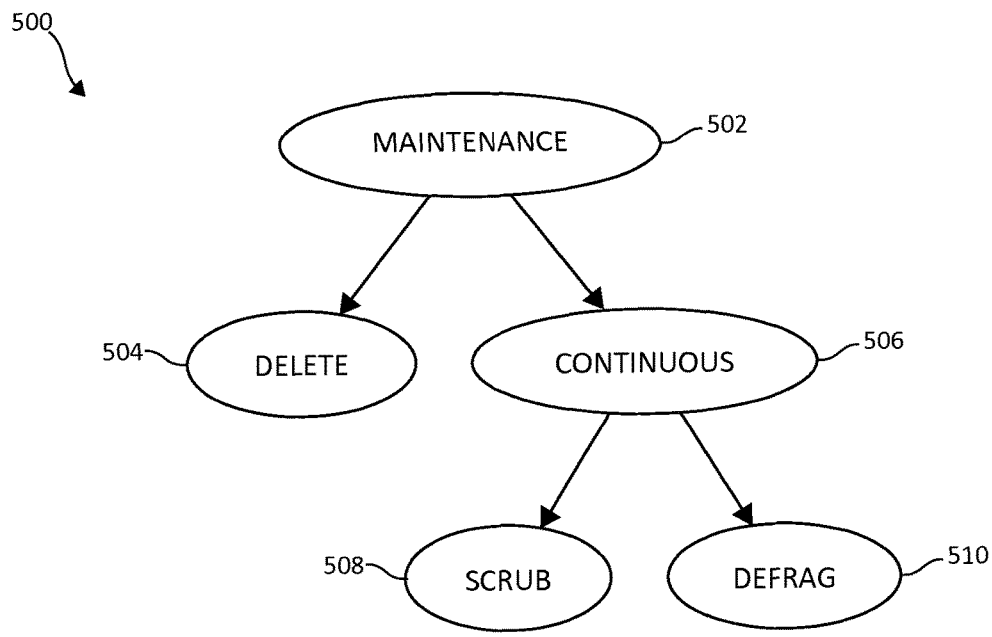
FIG. 5 is a block diagram of one embodiment of a system for deduplicated data processing hierarchical rate control in a data deduplication system having a hierarchy structure in which aspects of the present invention may be realized in which aspects of the present invention may be realized.
Figure 6:
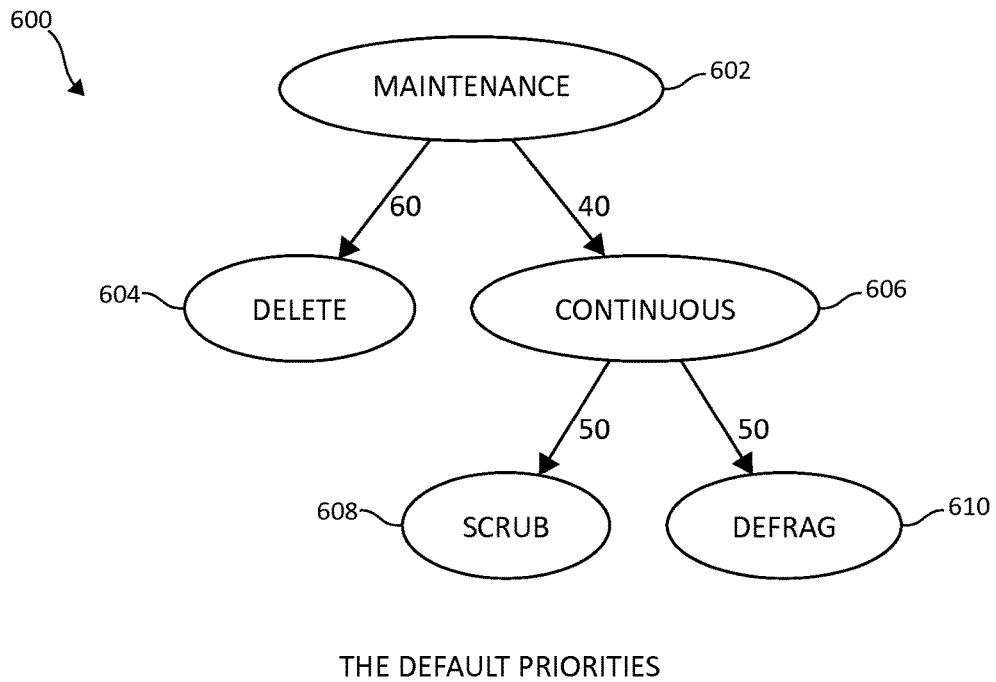
FIG. 6 is a block diagram of one embodiment of a system for default priorities in the in a data deduplication system having a hierarchy structure in which aspects of the present invention may be realized in which aspects of the present invention may be realized.
Figure 7:
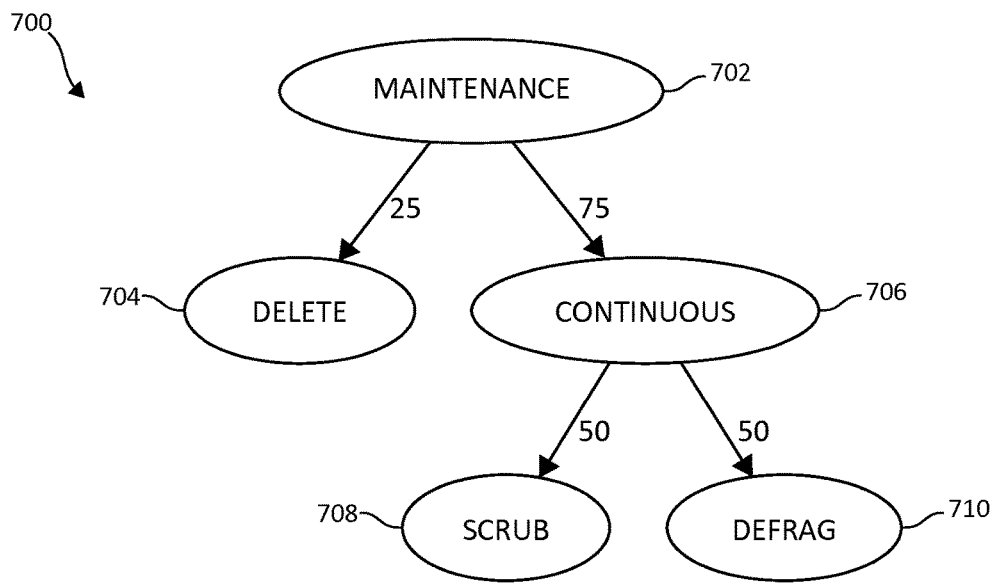
FIG. 7 is a block diagram of one embodiment of a system for priorities in a data deduplication system having a hierarchy structure having a low delete backlog in which aspects of the present invention may be realized in which aspects of the present invention may be realized.

Using FIGS. 5-7, below, the management of system resources and deduplicated data processing hierarchical rate control is further described based on need to manage the resources allocated to the following maintenance tasks, such as defragmentation (defrag), delete, and or a scrub task. Furthermore, it is desired, for illustration purposes only, that the delete task is to have 60% of the resources, and the rest of the sources to be divided between scrub task and defragmentation task. As illustrated in FIGS. 5-7, the hierarchy is defined by a tree-structure, the default priorities are used in a common load which requires deletion to be executed as soon as possible, but in a state of "low delete backlog" there may be a need to spend more resources on defragmentation and scrubbing.

FIG. 5 is a block diagram of one embodiment of a system for deduplicated data processing hierarchical rate control in a data deduplication system having a hierarchy structure in which aspects of the present invention may be realized. As illustrated in FIG. 5, the hierarchy is defined by a tree-structure 500, with a priority array created as: $P_{Defrag}$, $P_{Scrub}$, $Max_{continuos}$, $P_{Delete}$, and $Max_{Maintenance}$. This array creates the hierarchy that propagating priorities in a hierarchal structure 500 by defining a relationship between each maintenance task (e.g., the maintenance task 502, the delete task 504, the continuous task 506, the scrub task 508, and the defragmentation task 510) and using a resource distribution function for managing and dividing resources between the maintenance tasks based on a priority for each maintenance task.

FIG. 6 is a block diagram of one embodiment of a system for default priorities in the in a data deduplication system having a hierarchy structure in which aspects of the present invention may be realized in which aspects of the present invention may be realized. As illustrated in FIG. 6, the hierarchy is defined by a tree-structure 500, with a priority array created as: $P_{Defrag}$, $P_{Scrub}$, $Max_{continuos}$, $P_{Delete}$, and $Max_{Maintenance}$. This array creates the hierarchy that propagating priorities in a hierarchal structure 600 by defining a relationship between each maintenance task (e.g., the maintenance task 602, the delete task 604, the continuous task 606, the scrub task 608, and the defragmentation task 610) and using a resource distribution function for managing and dividing resources between the maintenance tasks based on a priority for each maintenance task.

In FIG. 6, the default priorities of the hierarchal structure are illustrated with the delete task 602 is to have 60% of the resources, and the rest of the resources to be divided between scrub task and defragmentation task. The continuous task is to receive 40% of the resources, from which the scrub task 608 and the defragmentation (defrag) task 610 each receive 50% of the remaining resources.

FIG. 7 is a block diagram of one embodiment of a system for priorities in a data deduplication system having a hierarchy structure having a low delete backlog in which aspects of the present invention may be realized in which aspects of the present invention may be realized. As illustrated in FIG. 7, the hierarchy is defined by a tree-structure 500, with a priority array created as: $P_{Defrag}$, $P_{Scrub}$, $Max_{continuos}$, $P_{Delete}$, and $Max_{Maintenance}$. This array creates the hierarchy that propagating priorities in a hierarchal structure 700 by defining a relationship between each maintenance task (e.g., the maintenance task 702, the delete task 704, the continuous task 706, the scrub task 708, and the defragmentation task 710) and using a resource distribution function for managing and dividing resources between the maintenance tasks based on a priority for each maintenance task.

As illustrated in FIG. 7, the hierarchy is defined by a tree-structure 700, the default priorities are used in a common load, which requires deletion to be executed as soon as possible. However, in FIG. 7, there is a state of "low delete backlog" and there is a need to spend more resources on defragmentation and scrubbing. In FIG. 7, as such, the delete task 702 is to have 25% of the resources, and the rest of the resources to be divided between scrub task and defragmentation task. The continuous task is to receive 75% of the resources, from which the scrub task 708 and the defragmentation (defrag) task 710 each receive 50% of the remaining resources.

Figure 8:
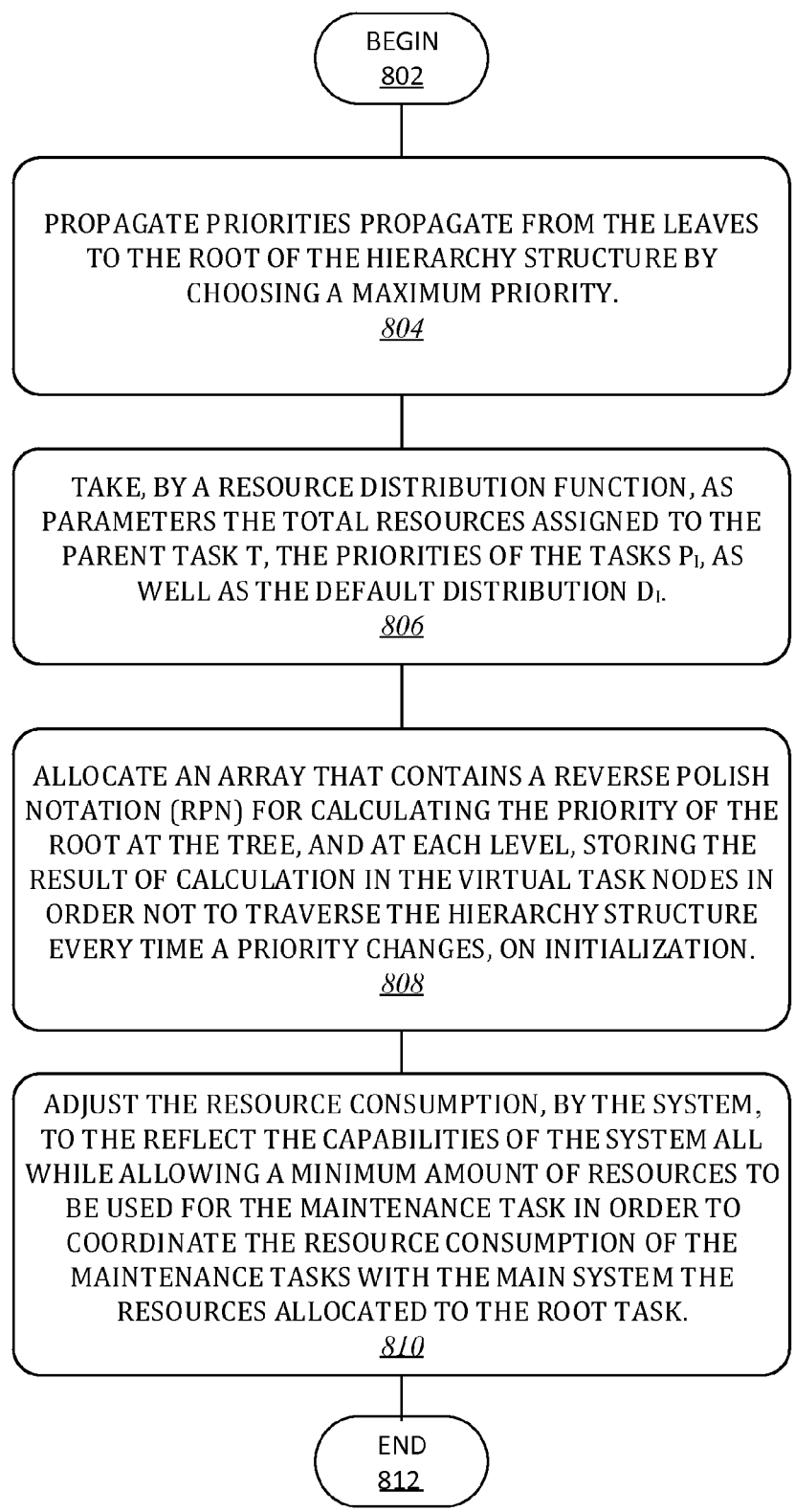
FIG. 8 is a flowchart illustrating an additional exemplary method for deduplicated data processing hierarchical rate control in a data deduplication system in which aspects of the present invention may be realized.

FIG. 8 is a flowchart illustrating an additional exemplary method 800 for deduplicated data processing hierarchical rate control in a data deduplication system in which aspects of the present invention may be realized. The method 800 begins (step 802) by propagating priorities propagate from the leaves to the root of the hierarchy structure by choosing a maximum priority (step 804). The resource distribution function takes as parameters the total resources assigned to the parent task T, the priorities of the tasks $p_i$, as well as the default distribution $d_i$ (step 806). In order not to traverse the hierarchy structure (e.g., the tree-structure) every time a priority changes, on initialization, the method 800 will allocate an array that contains a reverse polish notation (RPN) for calculating the priority of the root at the tree, and at each level, storing the result of calculation in the virtual task nodes (step 808).

In order to coordinate the resource consumption of the maintenance tasks with the main system the resources allocated to the root task, the method 800 adjusts the resource consumption by the system to the reflect the capabilities of the system all while allowing a minimum amount of resources to be used for the maintenance task (step 810). The method 800 ends (step 812)

In one embodiment, the present invention provides for deduplicated data processing hierarchical rate control in a data deduplication system by at least one processor device in a computing storage environment. In one embodiment, by way of example only, the method propagates priorities in a hierarchal structure by defining a relationship between each of a plurality of maintenance tasks and using a resource distribution function for managing and dividing resources between the plurality of maintenance tasks based on a priority for each maintenance task.

In one embodiment, the present invention defines each one of the plurality of maintenance tasks to be one of above, below, and at a same level in the hierarchal structure as compared to another one of the plurality of maintenance tasks, wherein the hierarchal structure is a tree structure having a plurality of leaf nodes that are actual task and branch nodes that are virtual tasks and the plurality of maintenance tasks include at least one of a defragmentation operation, a delete operation, and a garbage collection operation.

In one embodiment, the present invention uses by the resource distribution function a plurality of parameters, wherein the plurality of parameters include a total number of resources assigned to a parent task, a priority of each one of the plurality of maintenance tasks, a default distribution of resources parameter.

In one embodiment, the present invention allocates an array that contains a reverse polish notation (RPN) for calculating the priority of a root of the hierarchal structure and storing at each level of the hierarchal structure a calculated priority result in the branch nodes for preventing a traversal of the hierarchal structure.

In one embodiment, the present invention adjusts resources allocated to a root task in the hierarchal structure for coordinating resource consumption of the plurality of maintenance tasks and allowing a minimum amount of the resources to be used for one of the plurality of maintenance tasks.

In one embodiment, the present invention uses the priorities of each one of the plurality of maintenance tasks as a hint for indicating which of the plurality of maintenance tasks are most important.

In one embodiment, the present invention controls, by a central controller, a rate of work by each of the plurality of maintenance tasks in a computing system.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, fieldprogrammable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for deduplicated data processing hierarchical rate control in a data deduplication system using at least one processor in a computing environment, the method comprising:
propagating priorities in a hierarchal structure by defining a relationship between each of a plurality of maintenance tasks and using a resource distribution function for managing and dividing resources between the plurality of maintenance tasks based on a priority for each maintenance task; wherein the plurality of maintenance tasks include at least a defragmentation operation, a delete operation, and a garbage collection operation in a data deduplication repository within the data deduplication system; and
defining each one of the plurality of maintenance tasks to be one of above, below, and at a same level in the hierarchal structure as compared to another one of the plurality of maintenance tasks, wherein the hierarchal structure is a tree structure having a plurality of leaf nodes that are actual task and branch nodes that are virtual tasks.

2. The method of claim 1, further including using by the resource distribution function a plurality of parameters, wherein the plurality of parameters include a total number of resources assigned to a parent task, a priority of each one of the plurality of maintenance tasks, a default distribution of resources parameter.

3. The method of claim 2, further including allocating an array that contains a reverse polish notation (RPN) for calculating the priority of a root of the hierarchal structure and storing at each level of the hierarchal structure a calculated priority result in the branch nodes for preventing a traversal of the hierarchal structure.

4. The method of claim 3, further including adjusting resources allocated to a root task in the hierarchal structure for coordinating resource consumption of the plurality of maintenance tasks and allowing a minimum amount of the resources to be used for one of the plurality of maintenance tasks.

5. The method of claim 4, further including using the priorities of each one of the plurality of maintenance tasks as a hint for indicating which of the plurality of maintenance tasks are most important.

6. The method of claim 1, further including controlling, by a central controller, a rate of work by each of the plurality of maintenance tasks in a computing system.

7. A system deduplicated data processing hierarchical rate control in a data deduplication system in a computing environment, the system comprising:
the data deduplication system;
a central controller in the data deduplication system;
at least one processor device controlling the data deduplication system and the central controller and operable in the computing environment, wherein at least one processor device:
propagates priorities in a hierarchal structure by defining a relationship between each of a plurality of maintenance tasks and using a resource distribution function for managing and dividing resources between the plurality of maintenance tasks based on a priority for each maintenance task; wherein the plurality of maintenance tasks include at least a defragmentation operation, a delete operation, and a garbage collection operation in a data deduplication repository within the data deduplication system; and
defines each one of the plurality of maintenance tasks to be one of above, below, and at a same level in the hierarchal structure as compared to another one of the plurality of maintenance tasks, wherein the hierarchal structure is a tree structure having a plurality of leaf nodes that are actual task and branch nodes that are virtual tasks.

8. The system of claim 7, wherein the at least one processor device uses by the resource distribution function a plurality of parameters, wherein the plurality of parameters include a total number of resources assigned to a parent task, a priority of each one of the plurality of maintenance tasks, a default distribution of resources parameter.

9. The system of claim 8, wherein the at least one processor device allocates an array that contains a reverse polish notation (RPN) for calculating the priority of a root of the hierarchal structure and storing at each level of the hierarchal structure a calculated priority result in the branch nodes for preventing a traversal of the hierarchal structure.

10. The system of 9, wherein the at least one processor device adjusts resources allocated to a root task in the hierarchal structure for coordinating resource consumption of the plurality of maintenance tasks and allowing a minimum amount of the resources to be used for one of the plurality of maintenance tasks.

11. The system of claim 10, wherein the at least one processor device uses the priorities of each one of the plurality of maintenance tasks as a hint for indicating which of the plurality of maintenance tasks are most important.

12. The system of claim 7, wherein the at least one processor device controls a rate of work by each of the plurality of maintenance tasks in a computing system.

13. A computer program product for deduplicated data processing hierarchical rate control in a data deduplication system in a computing environment by at least one processor device, the computer program product comprising a non-transitory computer-readable storage medium having computer-readable program code portions stored therein, the computer-readable program code portions comprising:

a first executable portion that propagates priorities in a hierarchal structure by defining a relationship between each of a plurality of maintenance tasks and using a resource distribution function for managing and dividing resources between the plurality of maintenance tasks based on a priority for each maintenance task; wherein the plurality of maintenance tasks include at least a defragmentation operation, a delete operation, and a garbage collection operation in a data deduplication repository within the data deduplication system; and a second executable portion that defines each one of the plurality of maintenance tasks to be one of above, below, and at a same level in the hierarchal structure as compared to another one of the plurality of maintenance tasks, wherein the hierarchal structure is a tree structure having a plurality of leaf nodes that are actual task and branch nodes that are virtual tasks.

14. The computer program product of claim 13, further including a third executable portion that uses by the resource distribution function a plurality of parameters, wherein the plurality of parameters include a total number of resources assigned to a parent task, a priority of each one of the plurality of maintenance tasks, a default distribution of resources parameter.

15. The computer program product of claim 14, further including a fourth executable portion that allocates an array that contains a reverse polish notation (RPN) for calculating the priority of a root of the hierarchal structure and storing at each level of the hierarchal structure a calculated priority result in the branch nodes for preventing a traversal of the hierarchal structure.

16. The computer program product of claim 15, further including a fifth executable portion that adjusts resources allocated to a root task in the hierarchal structure for coordinating resource consumption of the plurality of maintenance tasks and allowing a minimum amount of the resources to be used for one of the plurality of maintenance tasks.

17. The computer program product of claim 16, further including a sixth executable portion that performs each one of:

using the priorities of each one of the plurality of maintenance tasks as a hint for indicating which of the plurality of maintenance tasks are most important, and controlling a rate of work by each of the plurality of maintenance tasks in a computing system.

* * * * *